March 25, 1924.
H. D. ANDREWS
DOUGHNUT HOLDER
Filed April 15, 1922
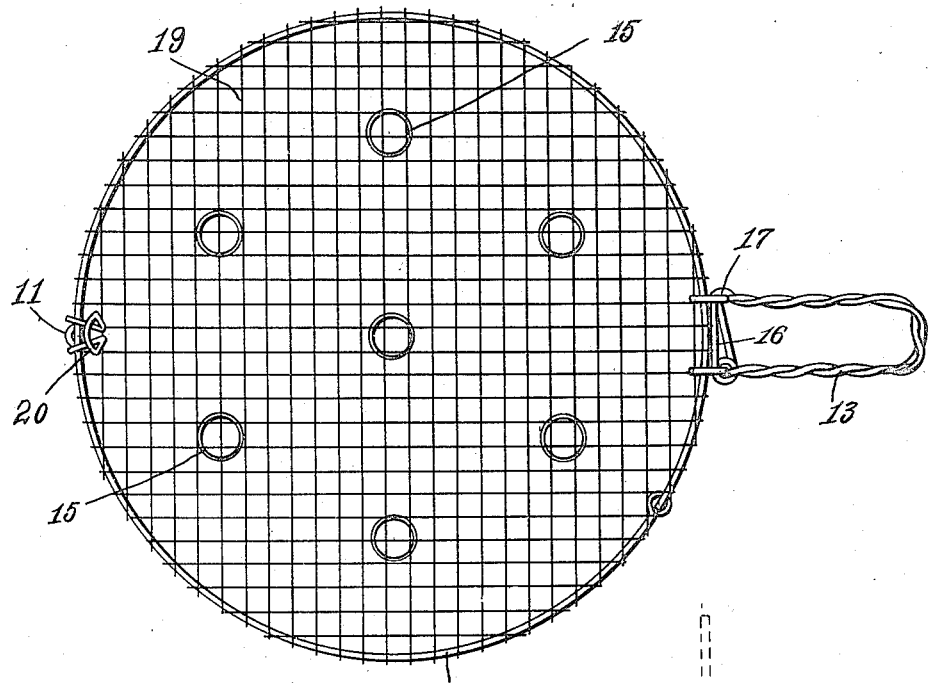
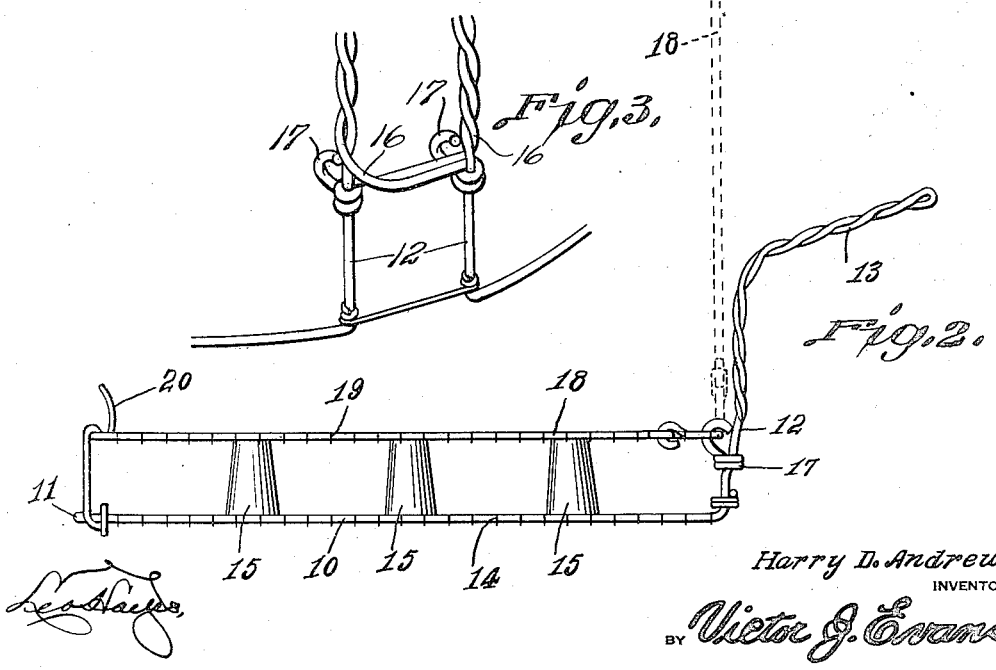
Harry D. Andrews
INVENTOR
1,487,909

Patented Mar. 25, 1924.

1,487,909

UNITED STATES PATENT OFFICE.

HARRY D. ANDREWS, OF CHEYENNE, WYOMING.

DOUGHNUT HOLDER.

Application filed April 15, 1922. Serial No. 552,940.

*To all whom it may concern:*

Be it known that I, HARRY D. ANDREWS, a citizen of the United States, residing at Cheyenne, in the county of Laramie and State of Wyoming, have invented new and useful Improvements in Doughnut Holders, of which the following is a specification.

This invention relates to cooking apparatus and has for its object the provision of a novel device for holding doughnuts while they are deposited into the boiling grease to effect cooking, the device being so constructed that a plurality of doughnuts may be handled at one time in a very simple manner and without danger of the operator being burned by the hot grease.

An important and more specific object is the provision of a device of this character which is provided with a hinged cover which will operate to hold the doughnuts in position while being cooked and which may be tilted or inverted to deposit the cooked doughnuts onto a plate or pan.

An additional object is the provision of a device of this character which will be simple and inexpensive in manufacture, easy to use, efficient and durable in service and a general improvement in the art.

With the above and other objects and advantages in view, the invention consists in the details of construction to be hereinafter more fully described and claimed, and illustrated in the accompanying drawings, in which:

Figure 1 is a plan view of the device,

Figure 2 is a side elevation with the cover shown in closed position by full lines and in opened position by dotted lines, Figure 3 is a detail perspective view showing the frame work construction.

Referring more particularly to the drawings I have shown my device as comprising a lower circular member 10 which is formed preferably from a single length of wire having its ends connected as shown at 11 and bent intermediate its ends to provide an upwardly extending U-shaped member 12 which has its bight portion laterally extending to constitute a handle 13 which is rigid with respect to the lower member. This lower member is also covered with wire screen indicated at 14 upon which are secured upstanding frusto-conical cores 15 arranged preferably as indicated. The handle further includes a U-shaped wire member 16 which has its arms wrapped together with the arms of the U-shaped portion 12 so as to reinforce the handle and provide the requisite stiffness. The lower ends of the arms of the U-shape wire 16 are formed into loops 17 with which is pivotally connected the upper member of the device, this upper member being a circular rim 18 covered with wire screen 19 and being of exactly the same size and formation as the lower member 10. The wire screen must be of the welded type and all the joints of the device must be either welded or formed by twisting the wires together as ordinary solder might melt at the temperature of the boiling grease used for cooking doughnuts.

Pivoted upon the edge of the lower member 10, preferably at a point diametrically opposite the handle is a wire catch 20 which engages over the edge of the upper member for holding the two members rigidly in position.

In the use of the device the operator releases the catch and swings the upper member into open position so that the doughnuts, after being cut, may be placed upon the cores 15, after which the upper member is swung down and refastened with the catch. The entire device holding the doughnuts is then submerged in the kettle of boiling grease so that cooking is effected in the usual manner, the handle providing means whereby the operator may safely perform the operations without danger of being burnt by the hot grease. After the cooking is completed the entire device is lifted out of the kettle, the catch is released and the upper member swung open so that when the device is inverted the doughnuts will drop off onto a plate or pan.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. A device of the character described comprising a frame formed from a single piece of wire bent into circular form intermediate its ends and having its end portions directed upwardly at right angles to the plane of the circular frame and brought together to define an upwardly extending U-shaped handle, the end portions after crossing to define the bight of the U being intertwisted with the arms of the U, and the terminal portions extending across the space between the arms of the U and coiled about the opposite arms, screen covering said circular frame, core elements carried by the screen and a reticulated circular cover pivoted upon said coiled terminals of the handle structure and detachably clamped against said cores.

2. A device of the character described comprising a supporting member formed as a circular frame covered with wire screen and formed at one side with an upwardly extending U-shaped handle formed integral with the frame and having its terminal portions coiled thereabout, the base portion of the handle being formed with a loop, a plurality of upstanding cores of a post like nature arranged upon said support and adapted to have doughnuts disposed thereupon, a circular top member formed as a frame covered with wire screen adapted to lie upon the upper ends of said cores, links pivotally connecting said last named member with the handle, one of said links engaging within said loop and a catch for holding said last named member in position.

In testimony whereof I affix my signature.

HARRY D. ANDREWS.